(12) United States Patent
Spindler

(10) Patent No.: US 8,943,787 B2
(45) Date of Patent: Feb. 3, 2015

(54) PACKAGING MACHINE FOR PACKS OF BEVERAGE CONTAINERS, A GUIDE SYSTEM FOR PACKAGING PACKS AND A METHOD FOR PACKAGING PACKS

(75) Inventor: Herbert Spindler, Riedering (DE)

(73) Assignee: Krones AG, Neutraubling (DE)

( * ) Notice: Subject to any disclaimer, the term of this patent is extended or adjusted under 35 U.S.C. 154(b) by 838 days.

(21) Appl. No.: 12/423,846

(22) Filed: Apr. 15, 2009

(65) Prior Publication Data

US 2009/0255220 A1    Oct. 15, 2009

(30) Foreign Application Priority Data

Apr. 15, 2008    (DE) .................. 10 2008 019 077

(51) Int. Cl.
B65B 11/00    (2006.01)
(52) U.S. Cl.
USPC .................. 53/580; 53/579; 53/218; 53/448
(58) Field of Classification Search
USPC ............... 53/580, 579, 209, 218, 378.3, 48.1, 53/448, 491
See application file for complete search history.

(56) References Cited

U.S. PATENT DOCUMENTS

| | | | | |
|---|---|---|---|---|
| 2,932,929 | A | * | 4/1960 | Fahrenbach et al. ............. 53/574 |
| 3,166,462 | A | * | 1/1965 | Schoder ........................ 156/499 |
| 3,492,923 | A | * | 2/1970 | Stenberg ...................... 493/167 |
| 3,504,478 | A | | 4/1970 | Dieter |
| 3,555,776 | A | | 1/1971 | Nigrelli et al. |
| 3,681,893 | A | * | 8/1972 | De Barge ........................ 53/209 |
| 4,215,525 | A | | 8/1980 | Nigrelli |
| 4,548,025 | A | | 10/1985 | Heisler |
| 4,562,687 | A | * | 1/1986 | Green, Jr. ...................... 53/376.5 |
| 4,592,190 | A | * | 6/1986 | Sherman et al. ................ 53/491 |
| 4,642,967 | A | | 2/1987 | Culpepper |
| 4,713,928 | A | * | 12/1987 | Tisma ............................. 53/526 |
| 5,379,573 | A | * | 1/1995 | Greenwell ...................... 53/491 |
| 5,417,032 | A | * | 5/1995 | Calvert et al. ................ 53/376.4 |
| 5,551,555 | A | * | 9/1996 | Gladieux et al. ........... 198/836.3 |
| 5,605,027 | A | | 2/1997 | Scroggin et al. |
| 6,058,679 | A | * | 5/2000 | Ziegler et al. .................. 53/448 |
| 6,199,681 | B1 | | 3/2001 | Ballos, III |
| 6,511,405 | B1 | | 1/2003 | Focke et al. |

FOREIGN PATENT DOCUMENTS

| | | |
|---|---|---|
| CH | 394933 | 6/1965 |
| DE | 40 27 395 A1 | 4/1992 |
| EP | 1 084 954 A2 | 3/2001 |
| NL | 1014204 | 7/2001 |

\* cited by examiner

*Primary Examiner* — Sameh H. Tawfik
(74) *Attorney, Agent, or Firm* — Simpson & Simpson, PLLC

(57) ABSTRACT

A packaging machine for packs of containers including a horizontal conveying means for the containers grouped as packs, a means for supplying flat paperboard sheets at the bottom side of the containers, wherein the containers are transported in a standing manner on the paperboard sheet, a means for folding upward front and back, in the transport direction, edge portions of the paperboard sheet, each of which extends beyond the footprint of the pack, at least two opposing lateral guide elements for folding upward lateral edges of the paperboard sheet extending laterally beyond the footprint of the grouped containers, wherein at least portions of the guide elements exert a defined pressing force on the upward-folded edges of the paperboard sheet and the side faces of the pack, and an adhesive is provided with edge portions of the lateral edges overlapping with front and/or back edges of the paperboard sheet.

6 Claims, 6 Drawing Sheets

1:2

PACKAGING MACHINE FOR PACKS OF BEVERAGE CONTAINERS, A GUIDE SYSTEM FOR PACKAGING PACKS AND A METHOD FOR PACKAGING PACKS

CROSS REFERENCE TO RELATED APPLICATIONS

This patent application claims priority of German Patent Application No. 10 2008 019 077.2, filed on Apr. 15, 2008, which application is incorporated herein by reference in its entirety.

FIELD OF THE INVENTION

The present invention relates to a packaging machine for packs of containers, such as bottles and/or beverage containers. Additionally, the present invention relates to a guide system for packaging packs of bottles and/or beverage containers which are standing on a flat paperboard sheet. Furthermore, the present invention relates to a method for packaging packs of containers, such as bottles and/or beverage containers.

BACKGROUND OF THE INVENTION

For the packaging of packs of several beverage containers and/or bottles, the beverage containers and/or bottles may be grouped on horizontal conveying means and combined to form groups of a defined number of containers. This defined number of grouped containers is usually provided with a film wrapping for easier handling, so that the packs may be easily transported, stacked and, if necessary, also presented in a sales room in this pack form.

For many types of packs, particularly for major packs, it is useful to apply paperboard packaging alternatively or in addition to the film packaging that encloses the packs nearly completely, the paperboard packaging stabilizing at least the bottom area and parts of an edge area. This paperboard packaging is applied by positioning the pack on a flat sheet of paperboard whose edges extend beyond the footprint of the pack on all sides. The edges may then be folded upward at a right angle and glued together at the overlapping lateral edges and/or at the interior surfaces. Adhesive bonding always requires overlapping side walls and front/back walls, because the overlapping portions form the glue flaps. The side walls may have a typical height that may correspond to about a third of the height to about half the height of the beverage containers and/or bottles. However, other dimensions may be suitable for the side walls, depending on the packaged goods.

The creasing and folding of the circumferential paperboard edge of the stabilizing pack bottom is usually performed with the help of guide elements arranged to both sides of the transport conveyor belt. These guide elements initially serve for bending the lateral edges of the paperboard packaging upward at a certain place and then pushing them against the sides of the pack after previous application of a suitable adhesive, such as hot glue or the like, to paperboard glue flaps provided for that purpose. While the pack is advanced, the guide elements serve for pressing the paperboard edge to the paperboard glue flaps previously provided with adhesive. The pack and/or the containers in the paperboard enclosure may serve as mating face withstanding the pressure, so that the paperboard enclosure is stabilized while the adhesive is hardening.

The above guide elements are usually made of plastic. They must be spaced such that the packs may easily pass, but at the same time such that the upward-folded edges of the paperboard packaging are pressed against the lateral edges of the packs, because otherwise it is not possible to reliably ensure that the adhesive bond is sufficiently stable. Therefore the packs may only have minimal tolerances with respect to their dimensions, because otherwise reliable functioning of the guide elements cannot be guaranteed.

BRIEF SUMMARY OF THE INVENTION

It is an object of the present invention to provide a packaging machine for packs of bottles and beverage containers which overcomes the disadvantages of prior art and guarantees consistent packaging quality even for packs of differing sizes.

The above object is achieved by a packaging machine for packs of bottles and/or beverage containers comprising a horizontal conveying means for the beverage containers grouped as packs and/or wrapped with a film or the like. The packaging machine comprises means for supplying flat paperboard sheets at the bottom side of the packs. Each of the packs is conveyed standing on the paperboard sheet. There are means for folding upward front and back, in the transport direction, edge portions of the paperboard sheet, each of which extends beyond the footprint of the pack(s). There are further provided lateral guide elements for pressing overlapping edge portions against the packs and/or for folding upward edges of the paperboard sheet extending laterally, in the transport direction, beyond the footprint of the pack and/or the containers standing on the paperboard. The overlapping portions have previously been provided with an adhesive and are pushed or pressed against the packs by means of the guide elements. The overlapping portions of the upward-folded edges have previously been provided with an adhesive on surfaces facing each other so that they adhere to each other and form a stable frame for the containers and/or packs. The lateral edge portions are pressed laterally against the pack with the help of the guide elements, wherein at the same time pressure is exerted on the adhesive bonds. For the invention to function properly, the overlapping portions must obviously be arranged laterally, in the transport direction, on the paperboard enclosure, so that the surfaces to be bonded may be pressed against each other by the guide elements.

It is another object of the present invention to provide and a guide system for a packaging machine which overcomes the disadvantages of prior art and guarantees consistent packaging quality even for packs of differing sizes.

The object is achieved by a guide system for packaging packs of bottles and/or beverage containers which are standing on a flat paperboard sheet. There are at least two opposing guide elements which are arranged lateral to horizontal conveying means, wherein the containers grouped as packs and/or wrapped with a foil or the like pass between the at least two lateral, guide elements. Furthermore at least portions of the guide elements exert a defined elastic pressing force on upward-folded edges of the paperboard sheet and side faces of the pack. The guide elements being designed for folding upward the lateral edges of the paperboard sheet extending beyond the footprint of the pack, and for pressing the edges against the sides of the respective pack and/or for gluing the edges of the paperboard sheet, which are provided with an adhesive.

It is a further object of the invention to provide a corresponding method for packaging packs permitting high packaging quality.

Finally, the above object is achieved by a method for packaging packs of containers, such as bottles and/or beverage containers, comprising the steps of: transporting the containers grouped as packs and/or wrapped with a film or the like in a horizontal direction; providing a flat paperboard sheets at bottom side of the containers so that the containers and/or packs are each transported standing on the paperboard sheet; providing overlapping edge portions of the lateral edges and the front and/or back edges with an adhesive; folding upward in a transport direction a front and a back lateral edge of the paperboard sheet which extends beyond a footprint of the pack; folding upward edges of the paperboard sheet that, in the transport direction, extend laterally beyond the footprint of the pack and/or pressing tem against the pack, wherein edge portions of the lateral edges and the front and/or back edges overlap; and, exerting with portions of at least two guide elements a defined pressing force on the upward-folded edges of the paperboard sheet and the side faces of the pack in order to fix their position with the provided adhesive.

According to the invention, at least portions of the guide elements exert a defined pressing force on the upward-folded edges of the paperboard sheet, wherein the lateral surfaces of the pack form supporting mating surfaces. This is achieved by designing at least portions of the guide elements to be elastic. With respect thereto, a lateral spacing of the opposing guide elements in an unloaded state may, in particular, be smaller than the width of a pack passing between the guide elements. The guide elements, which yield outward elastically, may thus exert a pressing force on the upward-folded edges of the paperboard towards the sides of the pack and thereby also assist the hardening of the adhesive bond with which the overlapping edge portions are bonded to and pressed against each other to form a stable paperboard enclosure. The glue traces are pressed and hardened at the same time. Optionally, the spacing between the two opposing guide elements may also approximately correspond to the external dimensions of the paperboard.

In particular, each of the guide elements may be formed of a plurality of spring elements arranged one next to the other. For example, the spring elements may be formed of flat spring elements arranged close to each other so that the upward-folded paperboard edges are pressed against the packs passing between the guide elements. The spring elements may, for example, be made of spring-elastic metal or any other suitable material.

It is essential for the proper functioning of the guide elements that the spring elements have a springy resilience in the horizontal direction so that a lateral pressing force is exerted on the packs transported past the guide elements. For example, the spring elements may be fastened to support rails on one side and designed as flat springs at whose free ends the packs slide past, wherein the flat springs are more or less deformed at the same time. For example, a free end of each spring element may extend away from the support rail at an oblique angle in the transport direction of the horizontal conveying means and be pushed towards the support rail by the pack that touches it and is slidingly transported past it.

Furthermore, wedge-shaped deflectors may be arranged upstream of the guide elements in the transport direction for raising the paperboard edges extending laterally beyond the pack and for positioning the edges against the side faces of the pack. These deflectors serve for slightly raising the paperboard edges, which are initially flat and may be provided with perforations or predetermined folding points, and bringing them in the desired position in which they are then pressed against and/or glued to the lateral edges of the packs by means of the guide elements.

The spring elements may optionally each be attached to the lateral support rails in a rigid or elastic way. Preferably, the spring elements are designed to be thermally conductive so that they may additionally serve for removing excess heat from the gluing areas of the paperboard. Since the paperboard edges are usually glued with hot glue, the spring elements may thus also serve for dissipating the thermal energy contained in the hot glue, which is beneficial to faster hardening of the adhesive bond. In order to ensure good thermal conduction, the spring elements may particularly each be made of metal. An optional elastic suspension of the spring elements may be sized so that a defined heat transmission to the support rails is ensured.

Where the present description mentions packs, these may, for example, be packs of beverage containers or bottles. Such packs include, for example, grouped containers provided with a common film wrapping. Optionally, single containers may also be arranged in the paperboard enclosure, so that the paperboard enclosure together with the containers therein forms a pack. The bonded paperboard enclosure with the containers or packs therein may then, if necessary, again be wrapped with a film, particularly with a shrinkable film. Where the present description mentions containers or vessels, these may, for example, be bottles containing beverages. The containers may, however, also be paperboard packages containing beverages or other food or any other type of container.

BRIEF DESCRIPTION OF THE DRAWINGS

Further features, objects and advantages of the present invention will be presented in the following detailed description of a preferred embodiment of the invention, which serves as a non-limiting example and refers to the accompanying drawings. The same elements basically have the same reference numerals, and repetitive explanations may be omitted.

DETAILED DESCRIPTION OF THE INVENTION

Figure 1:
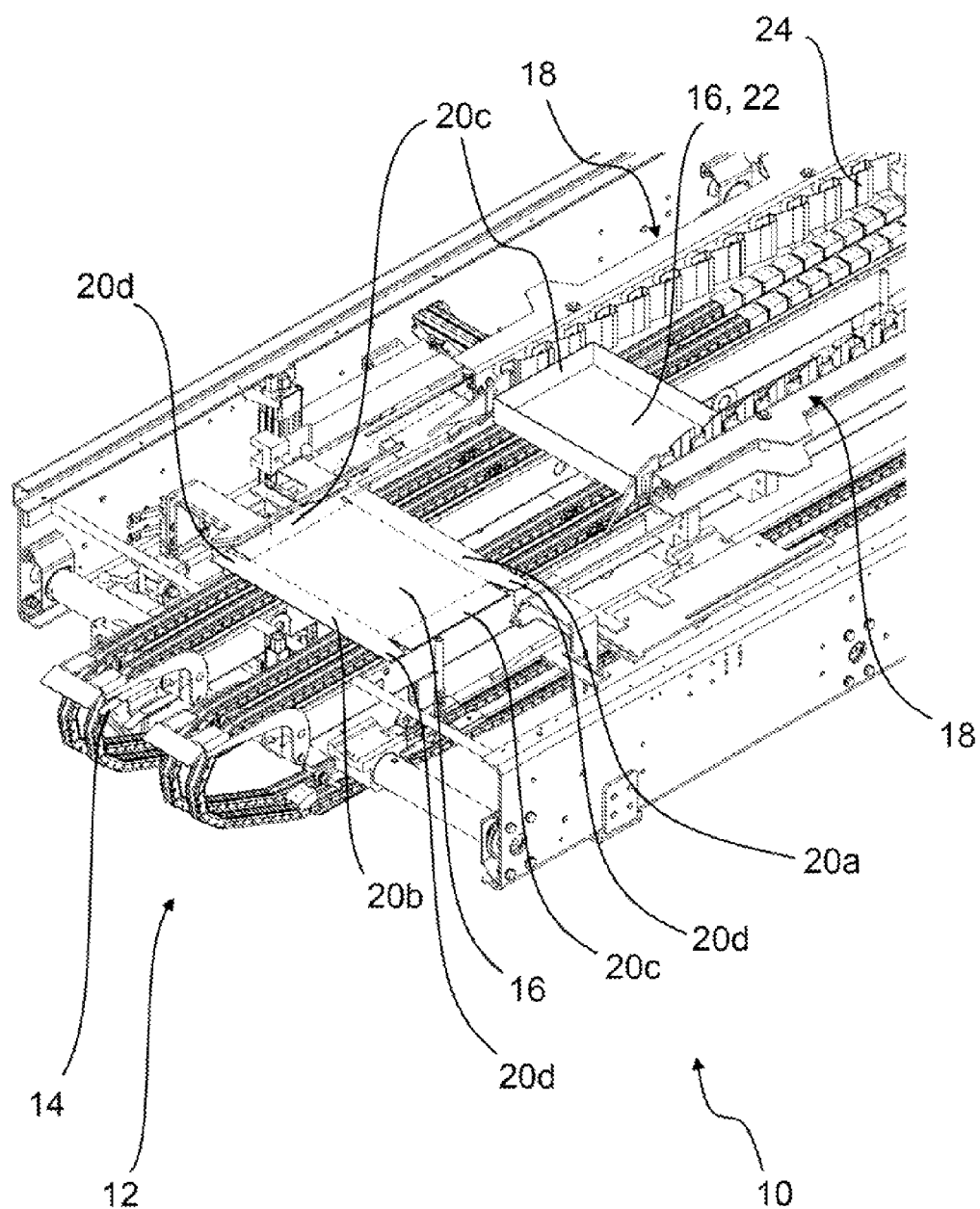
FIG. 1 shows a schematic illustration of a packaging machine for containers and/or packs with a guide system.

The schematic illustration of FIG. 1 shows an embodiment of a packaging machine 10 for packs of bottles and/or beverage containers comprising a horizontal conveying means 12 in the form of a circulating conveyor belt 14 for the beverage containers grouped as packs and/or wrapped with a film or the like. The packaging machine 10 comprises means for supplying flat paperboard sheets 16 at the bottom side of the packs. The packs, not shown, are each transported standing on the paperboard sheets 16. There are further provided lateral guide elements 18 for pressing and/or folding upward lateral edge portions 20 of the paperboard sheet 16 extending beyond the footprint of the pack, and for pressing the edges 20 against the sides of the respective pack.

Additional means for folding front and back, in the transport direction, edge portions 20*a* are not shown in FIG. 1. These front edge portions 20*a* and back edge portions 20*b* are folded upward before the paperboard sheet 16 reaches the lateral guide elements 18. Optionally, the edge portions 20c located laterally in the direction of transport may also be folded upward before reaching the passage formed by the opposing guide elements 18. In addition, overlapping corner areas 20d, each located laterally on the front and back edge portions 20a and 20b, are folded towards the lateral edge portions 20c. This may optionally be done with the help of the guide elements 18 or by separate means (not shown).

These overlapping edge portions and/or corner areas 20d are previously provided with an adhesive, such as hot glue, on their upper surfaces, so that, with the help of the guide elements 18, they may be pressed laterally to the lateral edge portions 20c, supported by the pack, and may at the same time be glued thereto, and these adhesive bonds may be pressed tightly. The guide elements 18 exert a defined pressing force on the upward-folded edge portions 20c and 20d of the paperboard sheet 16 and the side faces of the pack. This is achieved by designing the guide elements 18 to be elastic, as will be explained in more detail with reference to the following FIGS. 2-6.

As already indicated in FIG. 1, the lateral spacing of the opposing guide elements 18 in an unloaded state may be somewhat smaller than the width of a pack passing between the guide elements 18, the pack being illustrated herein by an already folded paperboard sheet 16. The guide elements 18, which yield outward elastically, may thus exert a pressing force on the upward-folded edge portions 20 of the paperboard sheet 16 towards the sides of the pack and thereby also help pressing and hardening the adhesive bond with which the edges are bonded to the pack to form a stable paperboard enclosure 22.

In the embodiment shown, the guide elements 18 are each formed of a plurality of flat spring elements 24 that are arranged one next to the other and closely spaced so that the upward-folded paperboard edges 20 are pressed against the packs passing between the guide elements 18. The flat spring elements 24 may, for example, be made of spring-elastic metal or any other suitable material, such as fiber-reinforced plastic.

As shown in FIGS. 2-6, the flat spring elements 24 have a springy resilience in the horizontal direction so that a lateral pressing force is exerted on the packs transported past the guide elements 18. The spring elements 24 are each fastened to support rails 26 on one side so that the free ends 28 of the flat spring elements 24 serve for guiding the packs sliding past the guide elements, wherein the flat spring elements 24 are more or less deformed at the same time. For example, a free end 28 of each spring element 24 may extend away from the support rail 26 at an oblique angle in the transport direction of the horizontal conveying means 12 and/or the conveyor belt 14 and may be pushed towards the support rail 26 by the pack that touches it and is slidingly transported past it.

Figure 2:
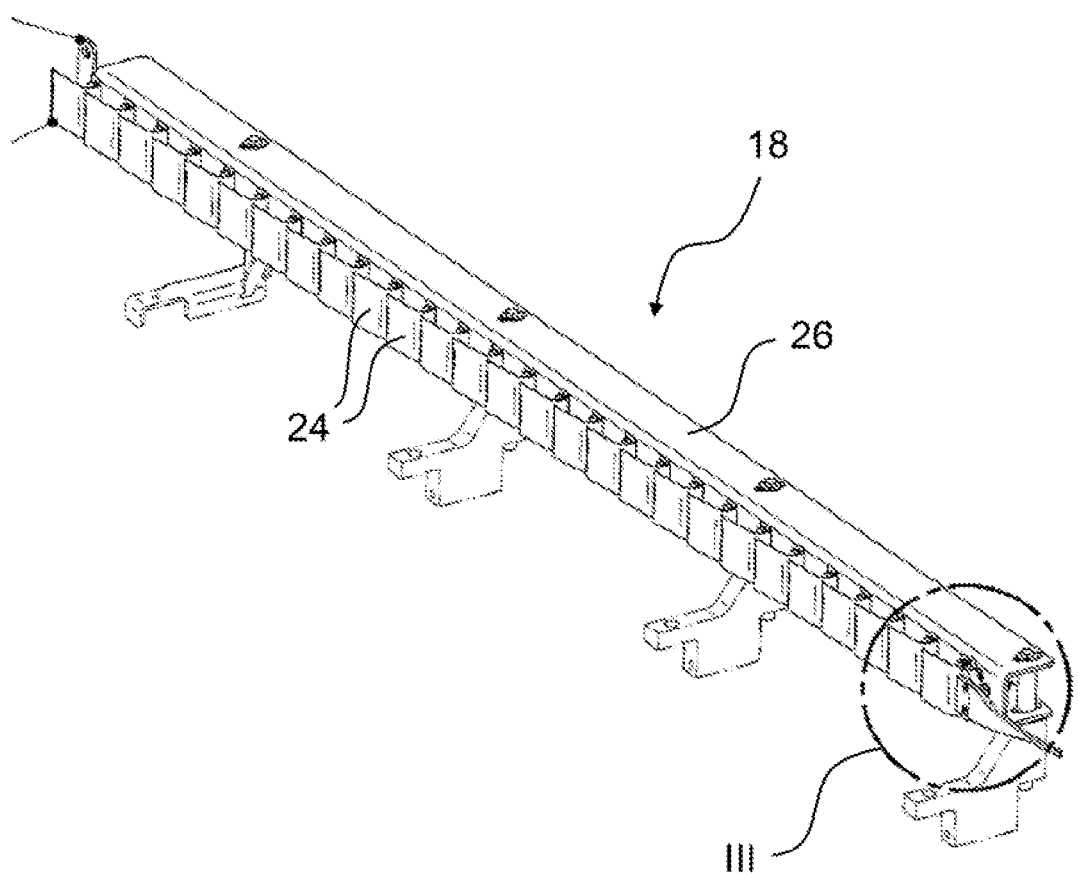
FIG. 2 schematically shows a first embodiment of a lateral guide element of the machine of FIG. 1.
Figure 3:
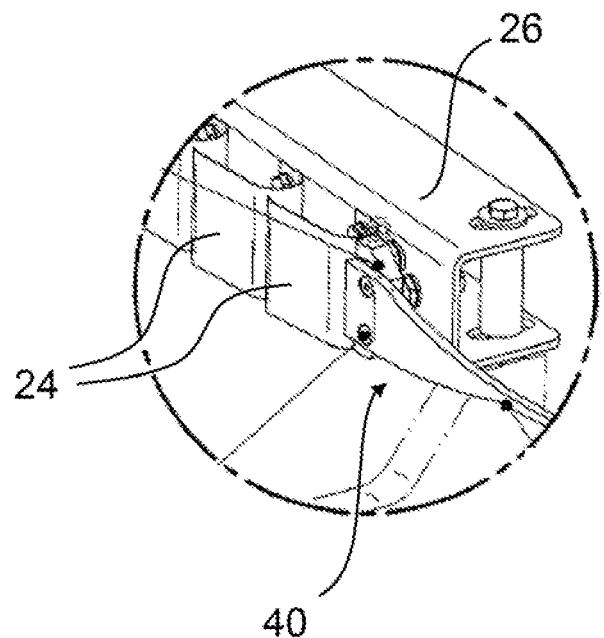
FIG. 3 shows a detail III of FIG. 2.
Figure 4:
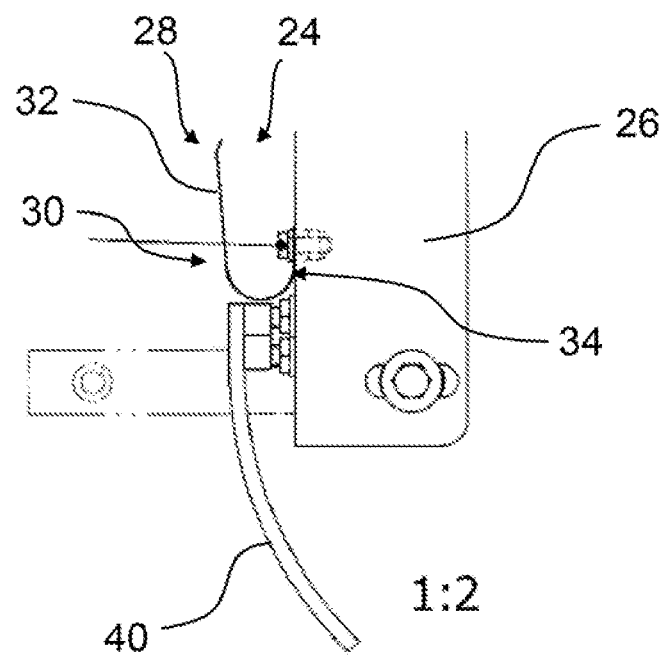
FIG. 4 shows a further detail of the guide element of FIG. 2.

FIGS. 2-4 illustrate a first embodiment of the flat spring elements 24, each of which is designed as a U-shaped metal sheet 30 whose longer leg 32 forms the resilient free end 28 and whose shorter leg 34 is screwed to the support rail 26.

Figure 5:
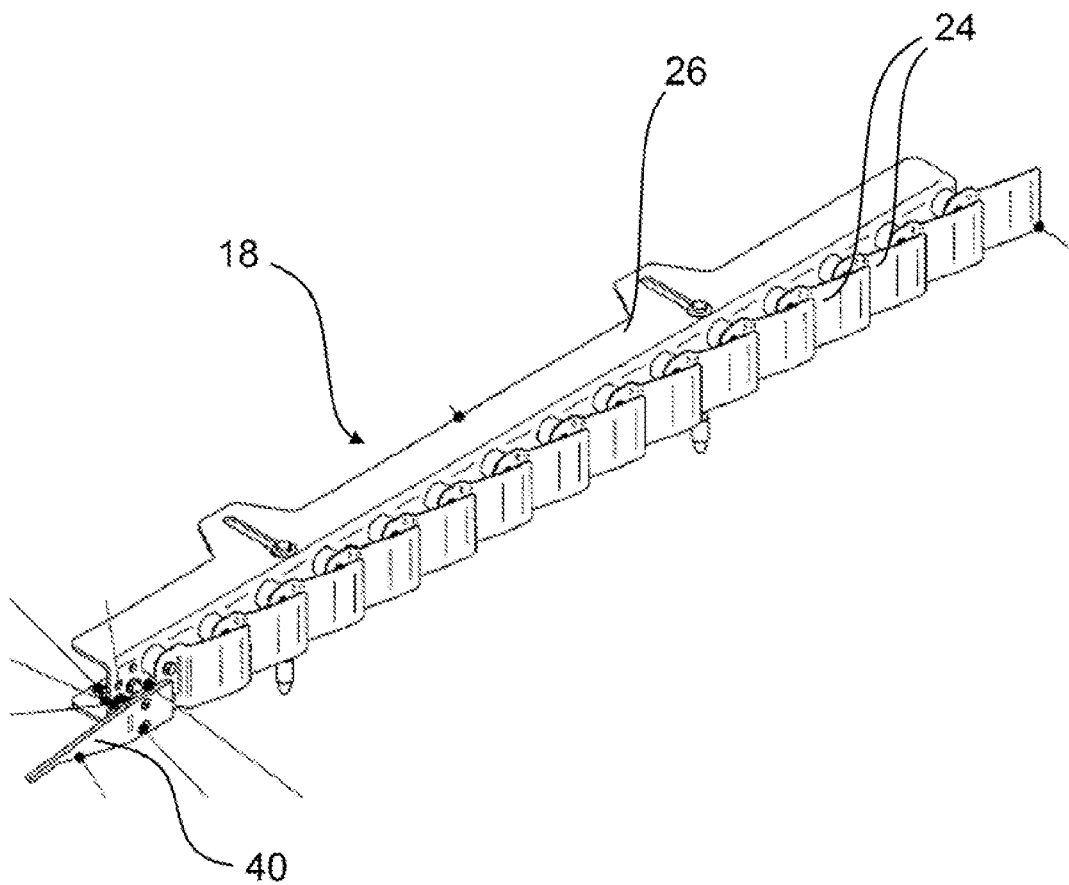
FIG. 5 schematically shows a further embodiment of a lateral guide element of the machine shown in FIG. 1.
Figure 6:
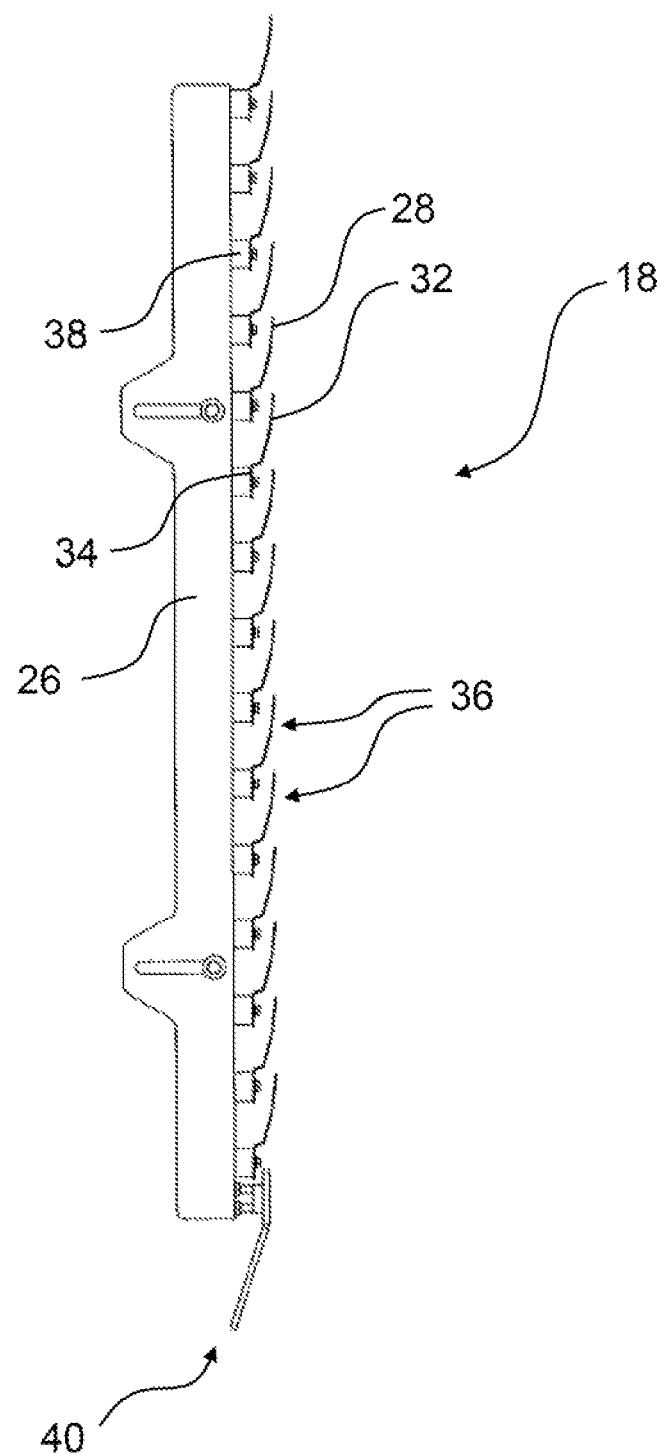
FIG. 6 shows a top view of the guide element of FIG. 5.

FIGS. 5 and 6 illustrate a second embodiment of the flat spring elements 24, which are in this case each designed as an S-shaped metal sheet 30 whose longer leg 32 forms the resilient free end 28 and whose shorter leg 34 is screwed to the support rail 26 by means of an elastic base 38. The longer leg 32 of each S-shaped metal sheet 36 is not exactly parallel to the shorter leg 34 screwed to the support rail 26, and instead forms an acute angle with the longitudinal axis of the support rail 26 and thus slightly slants away therefrom.

Furthermore, wedge-shaped or arrow-shaped deflectors 40 are arranged upstream of the guide elements 18 in the direction of transport for raising the paperboard edges 20c extending laterally beyond the pack and for positioning these lateral edge portions 20c against the side faces of the pack. These deflectors 40 serve for slightly raising the lateral paperboard edges 20c, which are initially flat and provided with perforations or predetermined folding points, and bringing them in the desired position in which they are then pressed against the laterally overlapping corner areas 20d of the front and back edge portions 20a and 20b by means of the guide elements 18, and the adhesive bonds are pressed against each other (see FIG. 1).

However, the deflectors 40 shown in FIGS. 2-6 are to be considered as optional. Optionally, the lateral edge portions 20c may be folded upward in another way, so that in this case only the flat spring elements 24 are required for exerting pressure on the adhesive bond between the corner areas 20d and the edges of the lateral edge portions 20c.

As can be seen in FIGS. 5 and 6, the spring elements 24 may each be elastically attached to the lateral support rails 26. Preferably, the spring elements 24 are designed to be thermally conductive so that they may additionally serve for removing excess heat from the gluing areas of the paperboard. Since the paperboard edges 20 are usually glued with hot glue, the spring elements 24 may thus also serve for dissipating the thermal energy contained in the hot glue, which is beneficial to faster hardening of the adhesive bond. In order to ensure good thermal conduction, the spring elements 24 are each made of metal in the embodiment shown. The elastic suspension of the spring elements 24 is sized such that a defined heat transmission to the support rails 26 is ensured.

FIGS. 2-6 further illustrate that the guide elements 18 to both sides of the transporting belt 14 are adjustable with respect to the spacing between them. For this purpose, the support rails 26 are provided with elongated holes for fastening, so that width adjustment of the guiding passage is possible by loosening the corresponding screws and laterally displacing the support rails.

Figure 7:
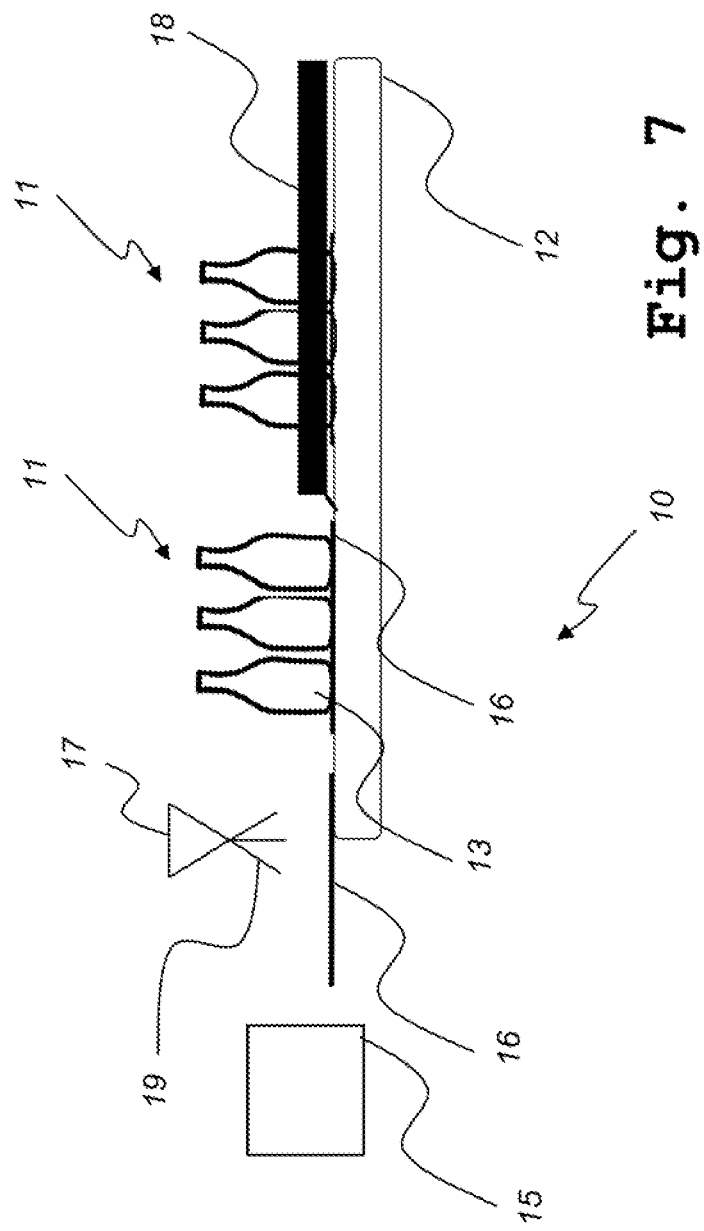
FIG. 7 shows a side view of a schematic illustration of a packaging machine for containers and/or packs with a guide system.

FIG. 7 shows a side view of a schematic illustration of a packaging machine 10 for containers, such as bottles 13, grouped as packs 11. The packs 11 are transported using a horizontal conveying means 12. Furthermore means 15 are shown for supplying flat paperboard sheet 16 at the bottom side of the packs 11, wherein the packs 11 are transported in a standing manner on the paperboard sheet 16. An adhesive 19 is provided for the paperboard sheet 16 via a device 17.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A packaging machine for packs of containers, such as bottles and/or beverage containers, comprising:
   a horizontal conveying means for the containers grouped as packs and/or wrapped with a foil or the like;
   a means for supplying flat paperboard sheets at the bottom side of the containers and/or packs, wherein the containers and/or packs are transported in a standing manner on the paperboard sheet;

a means for folding upward front and back edge portions of the paperboard sheet in a transport direction of the horizontal conveying means, each of which extends beyond a footprint of the pack;

at least two opposing lateral guide elements for folding upward lateral edges of the paperboard sheet extending laterally beyond the footprint of the grouped containers or the pack in the transport direction, wherein edge portions of the lateral edges of the paperboard sheet are provided with adhesive wherein at least portions of the at least two opposing lateral guide elements exert a defined pressing force on the upward-folded edges of the paperboard sheet and the side faces of the pack;

wherein at least a portion of the at least two opposing lateral guide elements are designed to be elastic;

wherein the guide elements are each formed of a plurality of stationary spring elements arranged one next to the other and which are each formed of flat spring elements and each lateral guide element has a stationary support rail to which the stationary spring elements are directly fastened on one side and wherein a free end of each spring element of each one of the pluralities of stationary spring elements simultaneously extends away from the support rail at an oblique angle in the transport direction of the horizontal conveying means and overlaps the adjacent stationary spring element and wherein each stationary spring element of each one of the pluralities of stationary spring elements is pushed towards the support rail by the pack that touches it and is slidingly transported past it;

wherein the flat spring elements are made of spring-elastic metal; and, wherein the spring elements have an elastic resilience in the horizontal direction.

2. The packaging machine recited in claim 1, wherein a lateral spacing of the opposing guide elements in an unloaded state is smaller than the width of a pack passing between the lateral guide elements.

3. The packaging machine recited in claim 1, wherein the spring elements are each elastically attached to the support rails.

4. The packaging machine recited in claim 1, wherein the spring elements are each designed to be thermally conductive.

5. The packaging machine recited in claim 1, wherein the spring elements are each made of metal.

6. The packaging machine recited in claim 1, wherein a wedge-shaped deflector is arranged upstream of each guide element in the transport direction for raising the paperboard edges extending laterally beyond the pack and for positioning the edges against the side faces of the pack.

* * * * *